June 17, 1969  L. A. SINCLAIR  3,449,854
TROLLING RIG
Filed Oct. 20, 1966
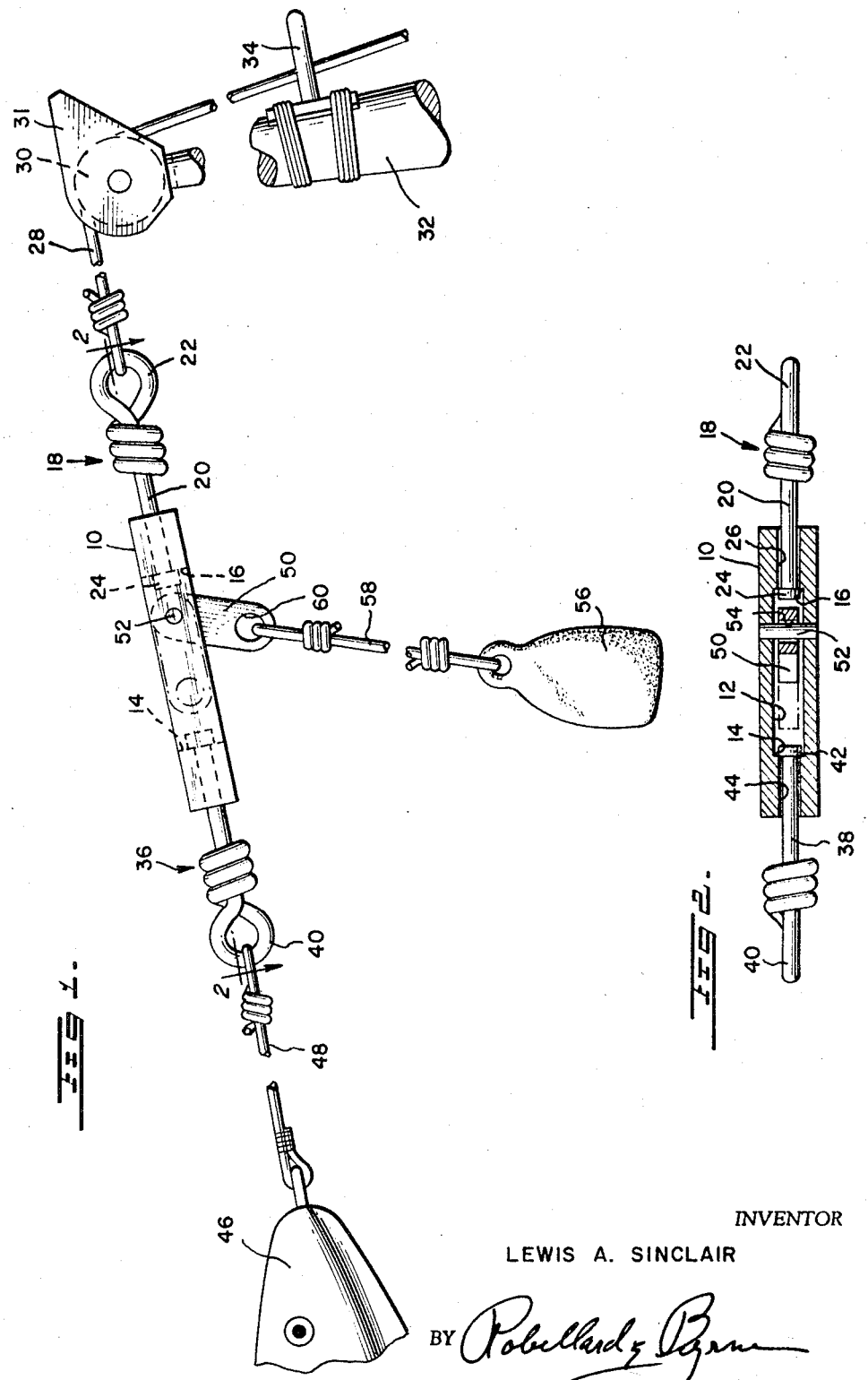
INVENTOR
LEWIS A. SINCLAIR
BY *Robillard & Byrne*
ATTORNEYS

United States Patent Office 3,449,854
Patented June 17, 1969

3,449,854
TROLLING RIG
Lewis A. Sinclair, 3803 Terrace Drive,
Annandale, Va. 22003
Filed Oct. 20, 1966, Ser. No. 588,054
Int. Cl. A01k 95/00, 73/08, 91/00
U.S. Cl. 43—43.1                                 3 Claims

ABSTRACT OF THE DISCLOSURE

A trolling swivel having a body portion with fishing line swivelly attached to each end thereof. A sinker line connector is pivotally attached to the body portion and may be retracted into the body portion when not in use enabling the swivel to be reeled in past the tip end line guide of a fishing rod.

---

This invention relates generally to fishing tackle and more particularly to a trolling rig for use in connection with trolling lines.

In rigging a line for trolling, it is common to provide a three-way connection in the line to attach a pole line, a lure leader and a sinker line. This connection is usually made through a member known as a swivel which is attached to the pole line. The swivel is then connected to a lure and a sinker so selected that the lure will run at the desired depth during trolling. The cross sectional area prior art swivels have heretofore been such that the lure line could not be completely reeled in since the swivel could not be brought past the roller tip or end guide of the fishing pole thereby leaving the lure and hooks free to swing on the end of the leader.

A further problem presented by the configuration of the prior art swivels was that, in dismantling the rod with wire line tackle, it was necessary to cut a portion of the line so that the swivel could be removed to allow the line and reel to be dismounted from the rod.

It is an object of this invention to provide a swivel for trolling rigs which can be reeled in past the roller tip end guide or ring of a fishing pole by providing a swivel of lesser cross sectional configuration than heretofore available.

It is another object of this invention to provide a trolling swivel which can be reeled in through the tip roller, end guide or guide rings of fishing poles by furnishing a pivotal connection for one portion of the swivel which may be swung to retract inside the leader to thereby present a minimal cross-sectional area therefor.

It is a further object of this invention to provide a swivel of the type described which may be economically manufactured and is durable and simple in use.

These and other objects of the invention will become better understood to those skilled in the art by reference to the following detailed description when viewed in light of the accompanying drawings wherein like numerals indicate like components throughout the figures thereof and wherein:

FIGURE 1 is an elevational view of a swivel in accordance with the invention rigged on a trolling line; and FIGURE 2 is a sectional view of the swivel of FIGURE 1 taken along the line 2—2 thereof with the rolling rig eliminated for purposes of clarity.

This invention is particularly suited for use with wire line tackle and is therefore so described hereinafter, however, it should be obvious that this device provides benefits with other types of tackle.

Referring now to FIGURES 1 and 2 of the drawings, the swivel comprises an elongated body portion 10 having a longitudinal slot 12 disposed therethrough terminating proximate either end thereof in transverse surfaces 14 and 16. A pole line connecting member, shown generally at 18 and comprising a shank 20, eyelet 22 and enlarged end portion 24, is disposed through a longitudinal bore 26 in the transverse surface 16. The shank 20 is preferably of smaller diameter than the bore 26 so that the pole line connector 18 may rotate with respect to the body 10. As shown in FIGURE 1, the eyelet 22 of the pole line connector 18 is connected to a wire pole line 28 which leads through a tip roller 30 and housing 31 of the type normally used with wire lines and through guide rings 34 to a reel (not shown), on a fishing pole 32.

A leader connector, shown generally at 36 and comprising a shank 38, eyelet 40 and enlarged end portion 42, is connected to the other end of the body 10 through a bore 44 in a manner identical to that described for the pole line connector 18. A lure 46 is connected to the eyelet 40 of the leader connector 36 by a leader 48.

The aforedescribed structure is of such dimension that the cross-sectional area thereof is small enough to traverse the tip roller 30 and housing 31 and the guide rings 34 of the pole 32 so that the line 28 and swivel may be removed from the pole 32 without requiring the line to be cut. In situations other than the disassembly of the gear, this capability of the swivel allows the lure 46 to be reeled in as far as the end of the pole.

An elongated sinker-connecting member 50 is disposed in the slot 12 and is pivotally connected to the body member 10 by a shaft 52 bridging the slot. The shaft 52 is fixed in appropriate bores through the body member 10 by force fit, upset riveting or any other suitable means. The shaft 52 is disposed through an enlarged bore 54 formed in one end of the member 50 so that the member may pivot with respect to the body 10. The member 50 is configured so that it may be completely retracted into the slot 12 as (shown in phantom line) thereby presenting an overall cross-sectional configuration no larger than that of the member 10. A sinker 56 is attached by means of a sinker line 58 to the member 50 through an eyelet 60 formed in the free end thereof.

In operation, a trolling line is rigged as described above for use. When it is desired to reel in the line, the sinker line 58 is detached from the sinker line connecting member 50 and that member is pivoted up into the slot 12. The lure 46 and leader 48 are then removed. The line may then be reeled in, the swivel being so formed as to pass by the roller tip 30 and the guide rings 34 on the pole 32 and the rigging removed. In normal use, the lure 46 may also be reeled up to the end of the pole 32 thereby avoiding the problem of lures and hooks swinging free on the leader 48. The standard tip guide ring of non-wire line type fishing poles also presents a problem similar to that of the tip roller so that it should be understood that this invention has application to all kinds of rods.

Obviously many modifications can be made to the above-described structure in view of the teachings set forth. For example, the shaft 52 may be located proximate the center of the body 10 so that the member 50 may swing in either direction up into the slot 12, or the shaft may be disposed proximate the other end of the body with the member 50 pivoting in a direction opposite that shown. A benefit of the latter mentioned configuration is that, unless purposely retracted into the body member 10 by the fisherman, the member 50 will prevent the swivel from being accidentally pulled through the roller tip 30 while the lure or sinker is being changed or when the line is reeled in. The width of the member 50 may also be such that the sides of the member engage the longitudinal sides of the slot 12, so that the member may be frictionally retained therein. Other means such as detents may also be provided to accomplish this same purpose.

What is new and, therefore, desired to be protected by Letters Patent of the United States Patent Office is:

1. In combination with a fishing rod having a tip end line guide, a fishing line extending through said line guide, a trolling swivel comprising an elongated body member swivelly connected at one end to the end of the fishing line, a leader swivelly connected to the opposite end of the trolling swivel, a sinker line connecting member pivotally attached to said body member intermediate the ends thereof and pivotable from an extended position to a retracted position parallel to said body member thereby facilitating the passage of said swivel past said line guide.

2. A swivel in accordance with claim 1 wherein said body means is provided with a slot therein, and wherein said sinker line connector is disposed completely within said slot in said retracted position.

3. A swivel in accordance with claim 2 wherein said connecting means for said line and leader comprise eyelets rotatably attached to said body member.

References Cited

UNITED STATES PATENTS

| | | | |
|---|---|---|---|
| 1,250,473 | 12/1917 | Ladd | 43—43.13 |
| 2,137,016 | 11/1938 | Franzen | 43—43.13 |
| 3,200,459 | 8/1965 | Hartman | 43—44.83 X |

SAMUEL KOREN, *Primary Examiner.*

D. J. LEACH, *Assistant Examiner.*

U.S. Cl. X.R.

43—43.15, 44.84